United States Patent
Ni (10) Patent No.: US 11,861,415 B1
(45) Date of Patent: Jan. 2, 2024

(54) OPTIMAL UTILIZATION OF HETEROGENEOUS CLUSTER IN CLOUD PLATFORMS USING SERVICE MESH

(71) Applicant: SAP SE, Walldorf (DE)

(72) Inventor: Peng Ni, Singapore (SG)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 17/875,690

(22) Filed: Jul. 28, 2022

(51) Int. Cl.
*G06F 9/50* (2006.01)

(52) U.S. Cl.
CPC ............ *G06F 9/5083* (2013.01); *G06F 9/505* (2013.01); *G06F 9/5072* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 9,726,502 B2 | 8/2017 | Ni et al. | |
| 97,778,051 | 10/2017 | Vo et al. | |
| 10,360,263 B2 | 7/2019 | Ni et al. | |
| 2021/0034673 A1 | 2/2021 | Ni | |
| 2023/0047880 A1* | 2/2023 | Lenrow | ............... H04L 41/0893 |
| 2023/0217343 A1* | 7/2023 | Kairali | ................ H04W 40/026 370/329 |

OTHER PUBLICATIONS

U.S. Appl. No. 17/488,422, Ni, filed Sep. 29, 2021.
Istio.io/latest/Istio [online], "Istio" Aug. 10, 2020, [retrieved on Jul. 27, 2022], retrieved from : URL <https://istio.io/latest/>, 7 pages.
Kubernetes.io [online], "Kubernetes." Oct. 19, 2014, [retrieved on Jul. 27, 2022], retrieved from : URL <https://kubernetes.io/>, 6 pages.

* cited by examiner

*Primary Examiner* — Scott C Sun
(74) *Attorney, Agent, or Firm* — Fish & Richardson P.C.

(57) ABSTRACT

Methods, systems, and computer-readable storage media for receiving, by a service mesh provisioned within a container orchestration system, a request from a client, determining, by the service mesh, a load balancing strategy that is to be applied for routing of the request within the heterogeneous cluster, and transmitting, by the service mesh, the request to a service within the heterogenous cluster, the service routing the request to a node for processing based on the load balancing strategy.

20 Claims, 4 Drawing Sheets

OPTIMAL UTILIZATION OF HETEROGENEOUS CLUSTER IN CLOUD PLATFORMS USING SERVICE MESH

BACKGROUND

In modern software deployments, containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers within cloud platforms. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

In container orchestration systems, such as Kubernetes, clusters include physical hardware (e.g., servers, processors, memory) that execute applications. As physical hardware and operating systems executing thereon are constantly developed and integrated into cloud platforms, it commonly occurs that clusters become heterogenous with respect to capabilities of the physical machines. However, scheduling workloads on heterogenous clusters is challenging and utilization of resources can be limited by the service load balancing strategy implemented by the container orchestration system.

SUMMARY

Implementations of the present disclosure are directed to scheduling workloads to clusters in container orchestration systems. More particularly, and as described in further detail herein, implementations of the present disclosure provide a service mesh to optimize utilization of physical hardware in heterogenous clusters.

In some implementations, actions include receiving, by a service mesh provisioned within a container orchestration system, a request from a client, determining, by the service mesh, a load balancing strategy that is to be applied for routing of the request within the heterogeneous cluster, and transmitting, by the service mesh, the request to a service within the heterogenous cluster, the service routing the request to a node for processing based on the load balancing strategy. Other implementations of this aspect include corresponding systems, apparatus, and computer programs, configured to perform the actions of the methods, encoded on computer storage devices.

These and other implementations can each optionally include one or more of the following features: the request is received by an ingress gateway of the service mesh; a virtual service of the service mesh receives the request from an ingress gateway of the service mesh and determines the load balancing strategy that is to be applied; the virtual service determines the load balancing strategy from a destination rule of the service mesh; the destination rule identifies the service within the heterogenous cluster as the host that is to apply the load balancing strategy; the load balancing strategy is least connection; the container orchestration system is Kubernetes.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to scheduling workloads to clusters in container orchestration systems. More particularly, and as described in further detail herein, implementations of the present disclosure provide a service mesh to optimize utilization of physical hardware in heterogenous clusters.

In some implementations, actions include receiving, by a service mesh provisioned within a container orchestration system, a request from a client, determining, by the service mesh, a load balancing strategy that is to be applied for routing of the request within the heterogeneous cluster, and transmitting, by the service mesh, the request to a service within the heterogenous cluster, the service routing the request to a node for processing based on the load balancing strategy.

To provide further context for implementations of the present disclosure, and as introduced above, in modern software deployments containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

In container orchestration systems, such as Kubernetes, clusters include physical hardware (e.g., servers, processors, memory) that execute applications. As physical hardware and operating systems executing thereon are constantly developed and integrated into cloud platforms, it commonly occurs that clusters become heterogenous with respect to capabilities of the physical machines. However, scheduling workloads on heterogenous cluster is challenging and utilization of resources can be limited by the service load balancing strategy implemented by the container orchestration system.

In further detail, and with example reference to Kubernetes, Kubernetes manages containers with pods, which are the smallest deployable objects in Kubernetes. Applications are usually defined as Kubernetes deployments, which are backed by a number of identical pods running application containers. Each application is exposed to the externals of the Kubernetes cluster through a service. The service provides an abstract way to expose an application running on a set of pods as a network service, and the service is connected to pods using label selectors. Each pod carries a set of labels and the service keeps track of the pods that it can communicate with. When a request is sent to the service routes the request to one of the backing pods. When there are multiple pods available, a round-robin load balancing strategy is used to distribute the load. That is, each pod is utilized in turn and the load is distributed equally to across all pods.

When a cluster is formed with physical hardware (machines) of the same type, the cluster is called a homogeneous cluster. Because container orchestration systems such as Kubernetes can run on any machine type, it is most common to choose a homogeneous cluster from a cloud provider. However, there are cases where a cluster can include different machine types, making it a heterogeneous cluster. For example, the following example situations result in heterogeneous clusters: the infrastructure is maintained in-house and new hardware is added into an existing cluster; the infrastructure is maintained by cloud hyperscalers and new machines are added on top of existing booked machines; and the infrastructure is maintained by cloud hyperscalers and heterogeneous machines are booked on purpose to ensure high resource availability.

When heterogenous clusters are formed, applications will run on machines with different capabilities. For example, some machines can be considered low-end (e.g., as low-end nodes) that have reduced capabilities (e.g., processing, memory) as compared with machines that are considered high-end (e.g., as high-end nodes). When a service is connected to pods of different capabilities, the default round-robin load balancer routes the same number of requests to the pods regardless of capability. A pod on a high-end machine is able to serve requests in a shorter time, yet it does not get more requests as compared to a pod on a low-end machine. This results in under-utilization of high-end machines and over-utilization of low-end machines. This creates a scenario, in which any advantages intended by deploying high-end machines are erased.

In view of the above context, implementations of the present disclosure provide a service mesh to optimize utilization of physical hardware in heterogeneous clusters. In some examples, a least connection load balancing strategy is used to distribute requests to nodes within heterogeneous clusters. As described in further detail herein, the service mesh enables a fine-grained load balancing strategy to route traffic in heterogenous clusters without any modification to applications. Example service mesh providers include Istio, Linkerd, and Kuma. For purposes of illustration, and without limitation, implementations of the present disclosure are described in further detail herein with reference to Istio, which can be described as open-source software that provides for the creation and management of service meshes that run natively within Kubernetes-orchestrated containers. However, it is contemplated that implementations of the present disclosure can be realized with any appropriate service mesh provider. As described herein, implementations of the present disclosure significantly improve performance of application servers as compared to a pure service approach, resulting in higher throughput and lower request latency.

Figure 1:
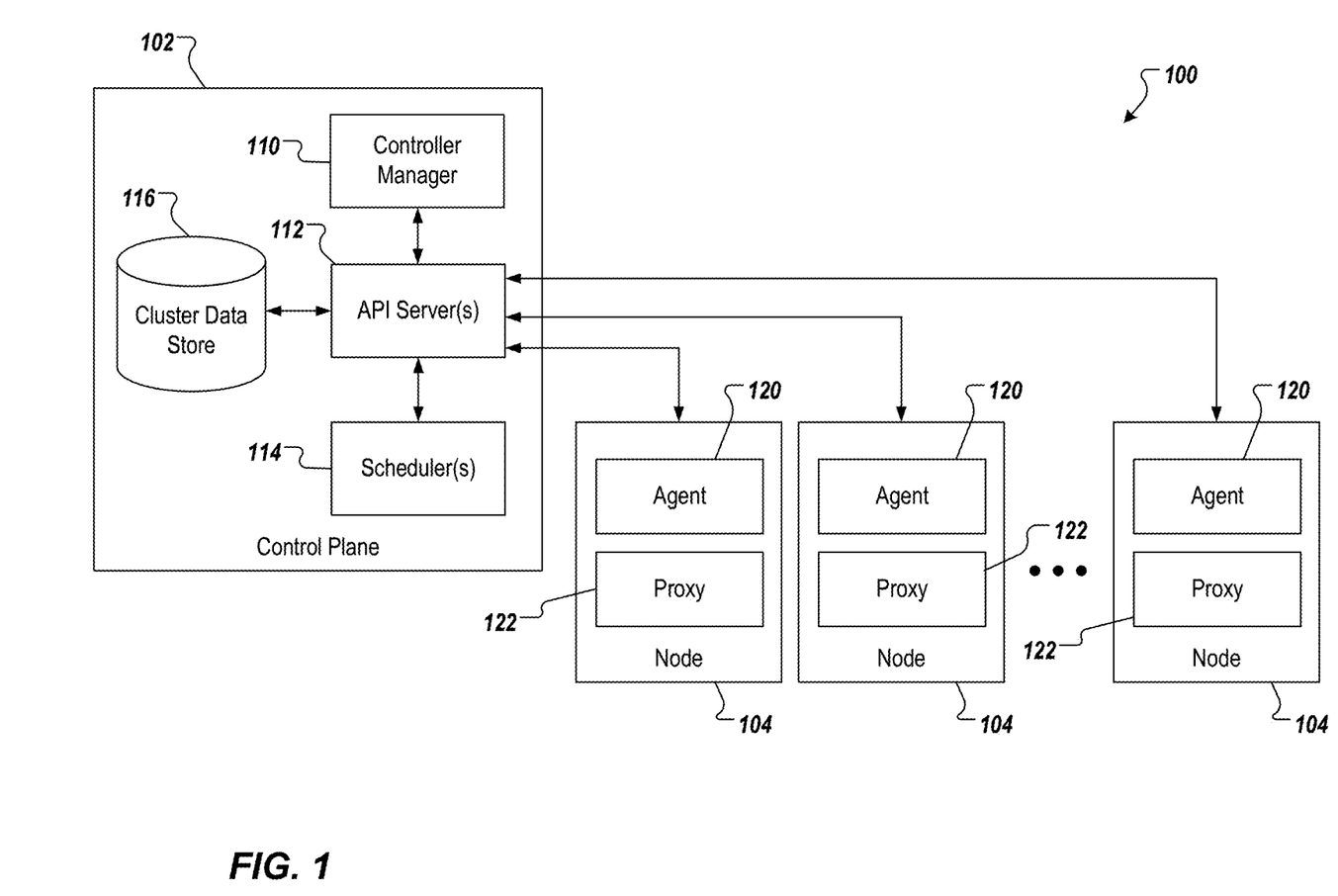
FIG. 1 depicts an example container orchestration architecture.

FIG. 1 depicts an example container orchestration architecture 100 in accordance with implementations of the present disclosure. In the depicted example, the example container orchestration architecture 100 represents deployment of a portion of a container orchestration system, Kubernetes introduced above. More particularly, the example architecture 100 represents a basic structure of a cluster within Kubernetes In the example of FIG. 1, the example architecture 100 includes a control plane 102 and a plurality of nodes 104. Each node 104 can represent physical worker machines and are configured to host pods. In Kubernetes, a pod is the smallest deployable unit of resources and each pod is provided as one or more containers with shared storage/network resources, and a specification for how to run the containers. In some examples, a pod can be referred to as a resource unit that includes an application container. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

Figure 2:
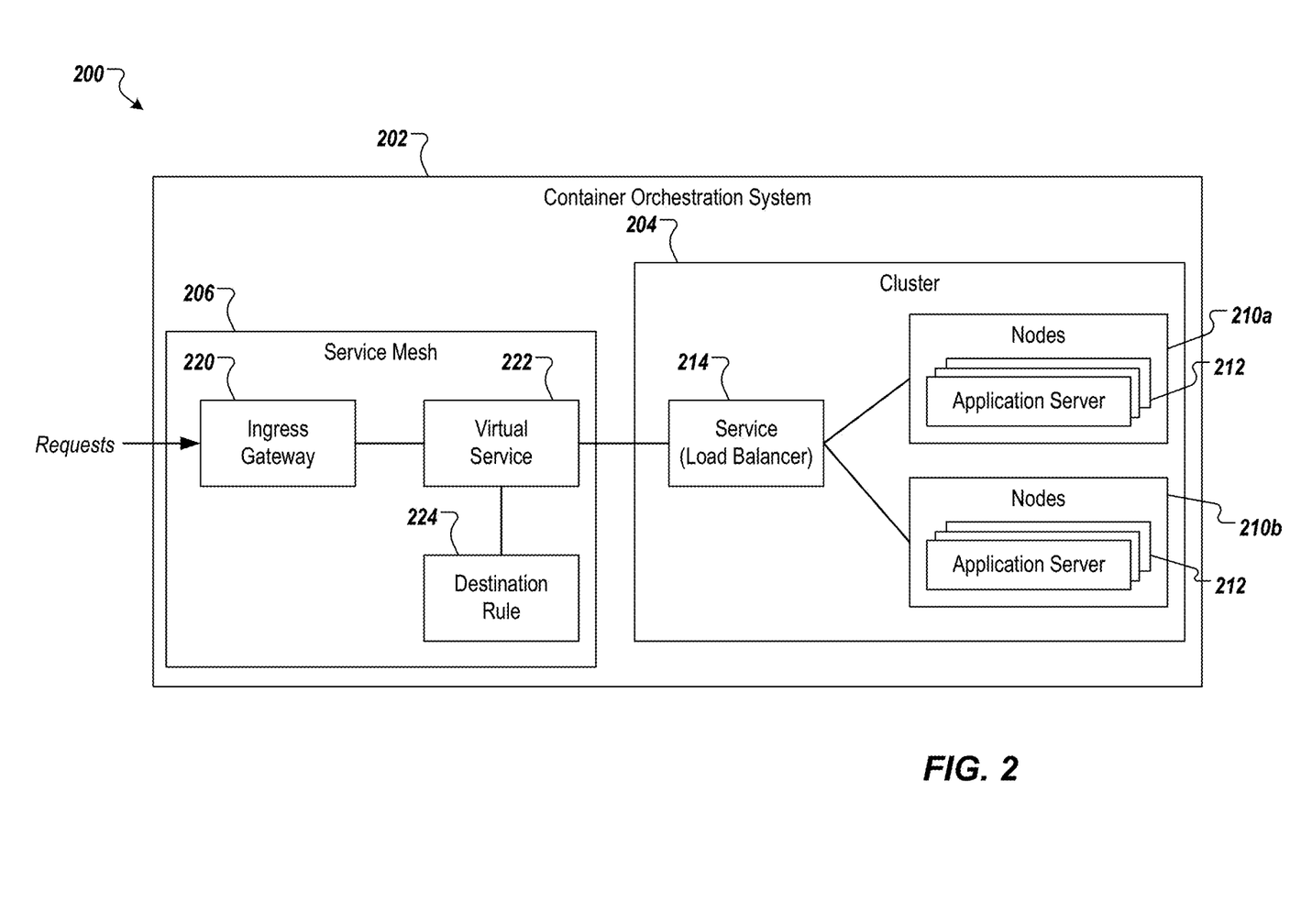
FIG. 2 depicts an example architecture that can be used to execute implementations of the present disclosure.

FIG. 2 depicts an example architecture 200 that can be used to execute implementations of the present disclosure. The example of FIG. 2 includes a container orchestration system 202 within which a cluster 204 is provided. In accordance with implementations of the present disclosure, a service mesh 206 is provided to route requests for processing to the cluster 204. In some examples, the service mesh 206 is provided within a control plane of the container orchestration system 202 (e.g., the control plane 102 of FIG. 1). Although a single cluster 204 is depicted in the example of FIG. 2, it is contemplated that the service mesh 206 can communicate with and route requests to any appropriate number of clusters 204.

As depicted in FIG. 2, the cluster 204 includes a first set of nodes 210a and a second set of nodes 210b. Here, each node in the first set of nodes 210a and the second set of nodes 210b is physical hardware that executes an instance of an application. For example, and as depicted in FIG. 2, the first set of nodes 210a hosts application servers 212 and the second set of nodes 210b hosts application servers 212. A service 214 is also provided, through which requests are routed to nodes in the first set of nodes 210a and the second set of nodes 210b.

In the context of the present disclosure, the first set of nodes 210a can be considered low-end nodes of the cluster 204 and the second set of nodes 210b can be considered high-end nodes of the cluster 204. Consequently, the cluster 204 is considered to be a heterogeneous cluster. In some examples, low-end represents that the nodes of the first set of nodes 210a have reduced capabilities (e.g., processing, memory) as compared to nodes of the second set of nodes 210b. With that, high-end represents that the nodes of the second set of nodes 210b have increased capabilities (e.g., processing, memory) as compared to nodes of the first set of nodes 210a. Although the example of FIG. 2 depicts two sets of nodes, it is contemplated that implementations of the present disclosure can be realized with any appropriate number of sets of nodes.

In the example of FIG. 2, the service mesh 206 includes an ingress gateway 220, a virtual service 222, and a destination rule 224. The service mesh 206 can be described as a dedicated infrastructure layer on top of the applications 204. The service mesh 206 enables capabilities to be transparently (from the perspective of the applications 204) added without modifying application code. Example capabilities include, without limitation, observability, traffic management, and security. The service mesh 206 can enable secure service-to-service communication in a cluster with Transport Layer Security (TLS) encryption, strong identity-based authentication and authorization, automatic load balancing for Hypertext Transfer Protocol (HTTP), Remote Procedure Call (RPC) (e.g., gRPC), WebSocket, and Transmission Control Protocol (TCP) traffic. The service mesh 206 also enables fine-grained control of traffic behavior with rich routing rules, retries, failovers, and fault injection.

In some implementations, an external endpoint (e.g., domain name) is exposed by the service mesh 206 (e.g., exposed by the ingress gateway 220). Here, the external endpoint that had been previously exposed by the service 214 (i.e., prior to implementation of the service mesh 206) is no longer needed. Instead, the service mesh 206 takes on the external endpoint of the service 214. In this manner, clients can use the same external endpoint as used previously without change. If, however, the service mesh 206 is configured with a new external endpoint, clients need to change their code to point to this new external endpoint.

In some implementations, the destination of the request (e.g., which node in the first send second sets of nodes 210a, 210b to send the request to) is known by the virtual service 222 with the assistance of the service 214. In some examples, the service 214 stores information of all of the available pods (i.e., distributed across the first set of nodes 210a and the second set of nodes 210b).

In further detail, the ingress gateway 220 is the entry point to the service mesh 206 and exposes communication routes (e.g., HTTP, HTTP) from outside of the cluster to services within the cluster. That is, external traffic that is directed to the application is routed to the ingress gateway 220. In some examples, a host is configured and a communication protocol (e.g., HTTP, HTTPS) is set. Listing 1, below, represents an example of an ingress gateway named bocr-gateway:

Listing 1: Example Ingress Gateway

```
apiVersion: networking.istio.io/v1beta1
kind: Gateway
metadata:
   name: bocr-gateway
   namespace: default
spec:
   selector:
      istio: ingressgateway
   servers:
   - hosts:
      - '*'
     port:
        name: http
        number: 80
        protocol: HTTP
```

In some examples, the virtual service 222 defines a set of traffic routing rules to apply when a host is addressed. Each routing rule defines matching criteria for traffic of a specific protocol. If the traffic is matched, the traffic is sent to a named destination service (e.g., the service 214 of the cluster 204). Listing 2, below, represents an example of a virtual service that is connected to the ingress gateway of Listing 1 and that routes all traffic to a Kubernetes service called line-based-bocr-service:

Listing 2: Example Virtual Service

```
apiVersion: networking.istio.io/v1beta1
kind: VirtualService
metadata:
   name: bocr-virtual-service
   namespace: default
spec:
   gateways:
   - bocr-gateway
   hosts:
   - '*'
   http:
   - match:
     - uri:
        prefix: /v1/models
     route:
     - destination:
        host: line-based-bocr-service
        port:
           number: 8501
```

In some examples, the destination rule 224 defines policies that apply to traffic intended for a service (e.g., the service 214 of the cluster 204) after routing has occurred. These rules specify one or more configurations. Example configurations include, without limitation, load balancing, connection pool size from a sidecar, and outlier detection settings to detect and evict unhealthy hosts from the load balancing pool.

In some implementations, the service mesh 206 can transmit requests to multiple clusters 204. In some examples, selection of the cluster 204 is based on a configuration, which can be provided as a mapping of a uniform resource locator (URL) of a request to the cluster 204 to route to. An example of this is represented in Listing 2, in which all requests with the URL pattern (v1/models) will be routed to a service called line-based-bocr-service (e.g., the service 214 of the cluster 204).

In accordance with implementations of the present disclosure, a load balancing strategy is configured in the destination rule 224 in order to optimize utilization of machines within the heterogeneous cluster (e.g., the heterogenous cluster that includes the first set of nodes 210a and the second set of nodes 210b). Example load balancing strategies include, without limitation, least connection, consistent hash, and locality load balancer. Implementations of the present disclosure are described in further detail with non-limiting reference to least connection.

In some examples, least connection load balancing is a dynamic load balancing algorithm where requests are distributed to an application server 212 with the least number of active connections at the time the request is received. Here, an active connection can be described as a connection to an application server 212, and thus respective node, during processing of the request by the application server 212. In short, the number of active connections that a node has is representative of a number of requests that the node is handling. In some examples, the service mesh 206 installs side-car containers in pods of the application servers 212, which are transparent to the application. In some examples, the side-car containers track a number of active requests being handled in respective nodes. In the case that multiple pods have an equal number of connections, and that number is determined to be the least, one is randomly chosen. In a heterogeneous cluster, the high-end machines (e.g., nodes in the second set of nodes 210b) would complete requests in a shorter time, resulting in fewer connections compared to low-end machines (e.g., nodes in the first set of nodes 210a). As a result, the load balancing strategy will send more requests to high-end machines than low-end machines. At the outset, as requests are initially sent to the cluster, it can be assumed that the machines get the same number requests.

Listing 3, below, represents an example destination rule that defines the load balancing strategy as least connection (LEAST_CONN), which is applied to the service line-based-bocr-service:

Listing 3: Example Destination Rule

```
apiVersion: networking.istio.io/v1alpha3
kind: DestinationRule
metadata:
   name: bocr-least-conn-rule
spec:
   host: line-based-bocr-service
   trafficPolicy:
      loadBalancer:
         simple: LEAST_CONN
```

Figure 3:
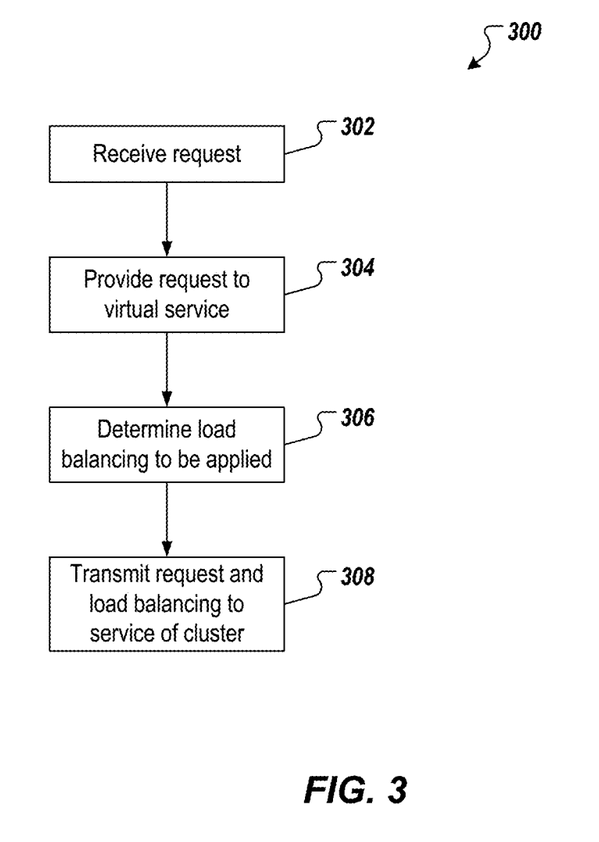
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable program executed by one or more computing devices.

A request is received (302). For example, and as described herein, a request is received by the ingress gateway 220 of the service mesh 206 of FIG. 2. The request is provided to a virtual service (304). For example, and as described herein, the ingress gateway 220 provides the request to the virtual service 222 of the service mesh 206. A load balancing strategy that is to be applied for handling the request is determined (306). For example, and as described herein, the virtual service 222 determines the load balancing strategy from the destination rule 224. In some examples, the load balancing strategy includes least connection. The request and load balancing strategy are transmitted to a service of a cluster (308). For example, and as described herein, the virtual service 222 transmits the request and the load balancing strategy to the service 214 of the cluster 204. As described herein, the service 214 routes the request to a node in one of the first set of nodes 210a and the second set of nodes 210b for processing. For example, and in the example case of least connection, the service 214 determines which node in the cluster has the least number of active connections and routes the request to that node.

Implementations of the present disclosure have been tested with respect to a traditional approach using an experimental set-up. In the experimental set-up, the service mesh approach of the present disclosure is compared to a pure Kubernetes service approach (i.e., load balancer applying round-robin) to evaluate respective performances on heterogeneous cluster utilization. The heterogenous cluster used in the experimental set-up included an Nvidia V100 (AWS instance type p3.2xlarge) and an Nvidia T4 (AWS instance type g4dn.2xlarge). Table 1, below, provides performance information of the respective machines when used to execute application servers:

TABLE 1

Experimental Set-up Machine Capabilities

| Node Type | Number of Clients (latency/throughput) | | | | |
|---|---|---|---|---|---|
| | 1 | 2 | 3 | 4 | 5 |
| V100 | 1000/1.0 | 1300/1.6 | 1500/1.9 | 1800/2.2 | 2300/2.2 |
| T4 | 1200/0.8 | 1500/1.3 | 1900/1.6 | 2500/1.6 | 3200/1.6 |

From Table 1, it can be seen that the V100 is more powerful and has a maximum throughput of 2.2 requests per second, while the T4 is slower and has a maximum throughput of 1.6 requests per second. Hence, the V100 can be referred to as high-end, while the T4 can be referred as low-end, relative to one another.

To compare the two approaches, a load test framework Locust with 10 concurrent users was implemented to send requests to application servers. The request throughput (in requests per second (RPS)) and request latency (in milliseconds (ms)) were measured. Table 2, below, summarizes the results:

TABLE 2

Experimental Results

| | Cluster Set-up | | | | |
|---|---|---|---|---|---|
| | Avg. Latency | Median Latency | Min. Latency | Max. Latency | Avg. Throughput |
| Traditional | 3387 | 3000 | 1091 | 7058 | 3.1 |
| Service Mesh | 2567 | 2100 | 994 | 6147 | 3.9 |

From Table 2, it can be seen that the traditional approach resulted in an average throughput of 3.1 RPS, which is only almost twice the performance of the slower T4 machine. Hence, it is seen that the traditional approach results in the faster V100 machine being under-utilized. In contrast, it can be seen that the service mesh approach of the present disclosure resulted in an average throughput of 3.9 RPS, which is approximately the sum of the best performance of the respective machines (i.e., 2.2+1.6=3.8). Hence, it is seen that the service mesh approach of the present disclosure results in a relatively balanced utilization between the machines. In this example, the average throughput of 3.9 (which is greater than the sum of 3.8) can be attributed to rounding and significant figures.

During execution of the experiment, it was noted that, for the traditional approach, the throughput of the application is not stable, and fluctuated between 2 and 3.5 RPS. For the traditional approach, it was also noted that the latency fluctuated, because, when a request is routed to the V100, it will be completed in a relatively short time, while a request routed to the T4 takes a relatively longer time to process. During execution of the experiment, it was noted that, for the service mesh approach of the present disclosure, the throughput of the application is stable as was the latency of the application, which is a result of the more powerful V100 machine receiving more requests and the slower T4 receiving fewer requests. The service mesh of the present disclosure routes requests in a way that the requests take a similar time to complete, because the faster machine will receive more requests and eventually slow.

Figure 4:
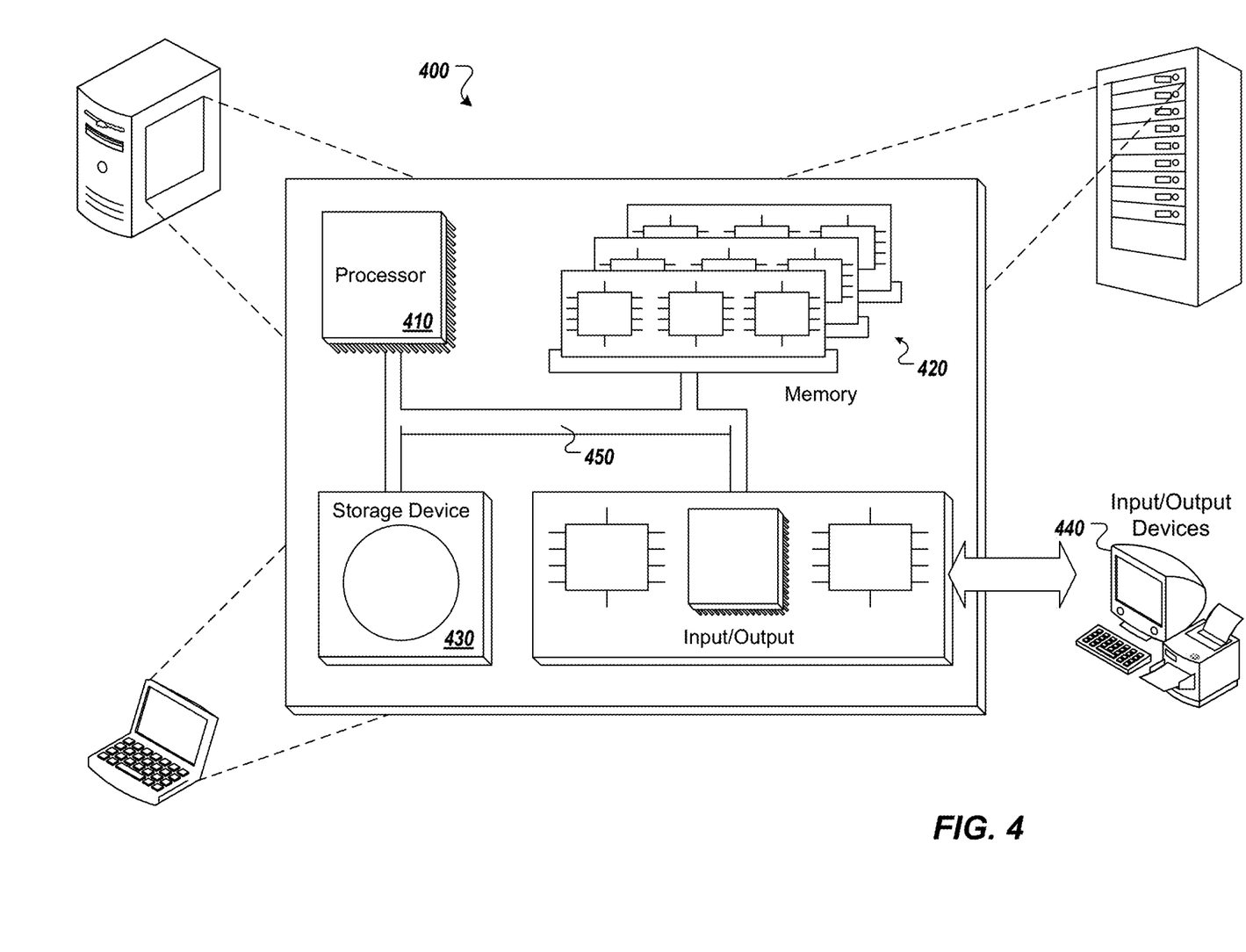
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for routing requests to an application that is executed on two or more nodes in a heterogenous cluster of a container orchestration system, the method being executed by one or more processors and comprising:
   receiving, by a service mesh provisioned within the container orchestration system, a request from a client;
   determining, by the service mesh, a load balancing strategy that is to be applied for routing of the request within the heterogeneous cluster; and
   transmitting, by the service mesh, the request to a service within the heterogenous cluster, the service routing the request to a node for processing based on the load balancing strategy.

2. The method of claim 1, wherein the request is received by an ingress gateway of the service mesh.

3. The method of claim 1, wherein a virtual service of the service mesh receives the request from an ingress gateway of the service mesh and determines the load balancing strategy that is to be applied.

4. The method of claim 3, wherein the virtual service determines the load balancing strategy from a destination rule of the service mesh.

5. The method of claim 1, wherein the destination rule identifies the service within the heterogenous cluster as the host that is to apply the load balancing strategy.

6. The method of claim 1, wherein the load balancing strategy comprises least connection.

7. The method of claim 1, wherein the container orchestration system comprises Kubernetes.

8. A non-transitory computer-readable storage medium coupled to one or more processors and having instructions stored thereon which, when executed by the one or more processors, cause the one or more processors to perform operations for routing requests to an application that is executed on two or more nodes in a heterogenous cluster of a container orchestration system, the operations comprising:
   receiving, by a service mesh provisioned within the container orchestration system, a request from a client;
   determining, by the service mesh, a load balancing strategy that is to be applied for routing of the request within the heterogeneous cluster; and
   transmitting, by the service mesh, the request to a service within the heterogenous cluster, the service routing the request to a node for processing based on the load balancing strategy.

9. The non-transitory computer-readable storage medium of claim 8, wherein the request is received by an ingress gateway of the service mesh.

10. The non-transitory computer-readable storage medium of claim 8, wherein a virtual service of the service mesh receives the request from an ingress gateway of the service mesh and determines the load balancing strategy that is to be applied.

11. The non-transitory computer-readable storage medium of claim 10, wherein the virtual service determines the load balancing strategy from a destination rule of the service mesh.

12. The non-transitory computer-readable storage medium of claim 11, wherein the destination rule identifies the service within the heterogenous cluster as the host that is to apply the load balancing strategy.

13. The non-transitory computer-readable storage medium of claim 8, wherein the load balancing strategy comprises least connection.

14. The non-transitory computer-readable storage medium of claim 8, wherein the container orchestration system comprises Kubernetes.

15. A system, comprising:
a computing device; and
a computer-readable storage device coupled to the computing device and having instructions stored thereon which, when executed by the computing device, cause the computing device to perform operations for routing requests to an application that is executed on two or more nodes in a heterogenous cluster of a container orchestration system, the operations comprising:
- receiving, by a service mesh provisioned within the container orchestration system, a request from a client;
- determining, by the service mesh, a load balancing strategy that is to be applied for routing of the request within the heterogeneous cluster; and
- transmitting, by the service mesh, the request to a service within the heterogenous cluster, the service routing the request to a node for processing based on the load balancing strategy.

16. The system of claim 15, wherein the request is received by an ingress gateway of the service mesh.

17. The system of claim 15, wherein a virtual service of the service mesh receives the request from an ingress gateway of the service mesh and determines the load balancing strategy that is to be applied.

18. The system of claim 17, wherein the virtual service determines the load balancing strategy from a destination rule of the service mesh.

19. The system of claim 18, wherein the destination rule identifies the service within the heterogenous cluster as the host that is to apply the load balancing strategy.

20. The system of claim 15, wherein the load balancing strategy comprises least connection.

* * * * *